United States Patent
Zheng et al.

(10) Patent No.: US 11,954,790 B2
(45) Date of Patent: Apr. 9, 2024

(54) WEB-SIDE REAL-TIME HYBRID RENDERING METHOD, DEVICE AND COMPUTER EQUIPMENT COMBINED WITH RAY TRACING

(71) Applicant: HANGZHOU QUNHE INFORMATION TECHNOLOGY CO., LTD., Hangzhou (CN)

(72) Inventors: Jiaxiang Zheng, Hangzhou (CN); Qing Ye, Hangzhou (CN); Rui Tang, Hangzhou (CN)

(73) Assignee: HANGZHOU QUNHE INFORMATION TECHNOLOGY CO., LTD., Hangzhou (CN)

( * ) Notice: Subject to any disclaimer, the term of this patent is extended or adjusted under 35 U.S.C. 154(b) by 143 days.

(21) Appl. No.: 17/630,480

(22) PCT Filed: Jun. 5, 2020

(86) PCT No.: PCT/CN2020/094756
§ 371 (c)(1),
(2) Date: Jan. 26, 2022

(87) PCT Pub. No.: WO2021/164150
PCT Pub. Date: Aug. 26, 2021

(65) Prior Publication Data
US 2022/0254093 A1     Aug. 11, 2022

(30) Foreign Application Priority Data
Feb. 19, 2020   (CN) .......................... 202010101444.X (51) Int. Cl.
*G06T 15/06* (2011.01)
*G06T 17/00* (2006.01)

(52) U.S. Cl.
CPC ............ *G06T 15/06* (2013.01); *G06T 17/005* (2013.01)

(58) Field of Classification Search
None
See application file for complete search history.

(56) References Cited

U.S. PATENT DOCUMENTS 7,973,790 B2    7/2011  Hempel et al.
9,984,492 B2 *  5/2018  Obert ...................... G06T 15/08
(Continued)

FOREIGN PATENT DOCUMENTS

CN      101685548       3/2010
CN      102509332       6/2012
(Continued)

OTHER PUBLICATIONS

Andrade et al., "Towards Heuristic Based Real Time Hybrid Rendering" (Year: 2014).*
(Continued)

*Primary Examiner* — Hilina K Demeter
(74) *Attorney, Agent, or Firm* — Jiwen Chen; Joywin IP Law PLLC (57) ABSTRACT

The present invention discloses a Web-side real-time hybrid rendering method, device and computer equipment combined with ray tracing. The method includes acquiring three-dimensional scene data and the textures transformed according to the three-dimensional scene data; for the part with slow convergence speed and low frequency of rendering result, employ rasterization rendering according to the three-dimensional scene data; for the part with fast convergence speed and high-frequency rendering results, employ ray tracing rendering according to the texture; according to the rasterization rendering result and/or the ray tracing rendering result, the rendering results of the current frame
(Continued)

and the historical frame are mixed. In this way, the problem of low rendering realism on the Web-side was solved, and high-quality global illumination effects can be achieved on the Web-side at a relatively low cost, which enhances the realism of rendering on the Web-side.

9 Claims, 3 Drawing Sheets

(56) References Cited

U.S. PATENT DOCUMENTS

| | | | | |
|---|---|---|---|---|
| 10,559,125 | B2* | 2/2020 | Deshwal | G06T 17/005 |
| 11,157,414 | B2* | 10/2021 | Muthler | G06T 1/60 |
| 2020/0051314 | A1* | 2/2020 | Laine | G06T 15/005 |
| 2020/0051315 | A1* | 2/2020 | Laine | G06T 15/005 |
| 2020/0211266 | A1* | 7/2020 | Brownlee | G06T 15/005 |

FOREIGN PATENT DOCUMENTS

| | | |
|---|---|---|
| CN | 105551075 | 5/2016 |
| CN | 110414148 | 11/2019 |

OTHER PUBLICATIONS

Tamm et al., "Web-enabled Server-based and Distributed Real-Time Ray-Tracing" (Year: 2016).*

* cited by examiner

WEB-SIDE REAL-TIME HYBRID RENDERING METHOD, DEVICE AND COMPUTER EQUIPMENT COMBINED WITH RAY TRACING

This is a U.S. national stage application of PCT Application No. PCT/CN2020/094756 under 35 U.S.C. 371, filed Jun. 5, 2020 in Chinese, claiming priority to Chinese Patent Applications No. 202010101444.X filed Feb. 19, 2020, all of which are hereby incorporated by reference.

TECHNICAL FIELD

The present invention belongs to the field of computer graphics, in particular, relates to a Web-side real-time hybrid rendering method, device and computer equipment combined with ray tracing.

BACKGROUND TECHNOLOGY

Ray tracing is a method of realistically displaying objects. The ray tracing method traces the light that reaches the viewpoint in the opposite direction, passes through each pixel on the screen, locates the surface point $P_0$ of the object that intersects with the line of sight, and continues to trace, find out all the light sources that affect the light intensity of $P_0$, so as to calculate the accurate light intensity at $P_0$ point, which is often used to express the mirror effect in texture editing. Ray tracing, or light tracing, is one of the core algorithms of computer graphics. In the algorithm, light rays are projected from the light source, and when they pass through the surface of the object, various transformations that conform to the laws of physical optics are applied to them. Eventually, the light enters the virtual camera film and the picture is generated.

Rasterization is the process of converting vertex data into fragments, and is capable of converting images into images composed of grid cells. It is characterized in that each element corresponds to a pixel in the frame buffer. Rasterization is actually a process of turning geometric primitives into two-dimensional images. The process consists of two parts of work. The first part of work is to determine which integer grid areas in the window coordinates are occupied by basic primitives; the second part of work is to assign a color value and a depth value to each area. Fragments are produced in the process of rasterization.

With the development of Internet technology, various resources and information are highly shared. Among them, the way of information sharing through the World Wide Web service provided by the Internet has become an indispensable part of people's daily life, work and entertainment. The information on the Web (World Wide Web) side is displayed and presented through the browser, and how to better simulate and display various applications, such as the three-dimensional model objects in the game, on the WEB side is a hot spot in today's Internet technology.

In recent years, with the rapid development of WebGL (Web Graphics Library) technology, Web-side three-dimensional graphics rendering applications have become more and more extensive, and online viewing and interaction of three-dimensional models has become more and more common. Currently, PBR rendering (Physically-Based-Rendering) is mainly used to achieve the final rendering result. But it is only an approximation of the rendering, and has always been difficult to achieve sense of reality. The rendering capabilities of either OpenGL or OpenGL ES API are very limited, usually only rasterization rendering can be done, and one of the drawbacks of rasterization rendering is that it has been unsatisfactory in terms of realism and global illumination.

On the other hand, ray tracing or path tracing is a method of solving rendering equations. Although it can achieve realistic light perception effects, one of its problems is that the computational cost is too large, making it difficult to apply ray tracing methods to real-time rendering.

SUMMARY OF THE INVENTION

In view of the foregoing, the present invention provides a Web-side real-time hybrid rendering method, device and computer equipment combined with ray tracing.

A Web-side real-time hybrid rendering method combined with ray tracing comprises the following steps:

obtaining the texture converted according to the three-dimensional scene data;

performing rasterization rendering according to the texture for the part with slow convergence speed and low frequency of rendering result;

performing ray tracing rendering according to the texture for the parts with fast convergence speed and high-frequency rendering results;

mixing the rendering results of the current frame and the historical frame according to the rasterization rendering result and/or the ray tracing rendering result.

A web-side real-time hybrid rendering device combined with ray tracing comprises:

an acquisition module, which is used to acquire the texture of the three-dimensional scene data conversion;

a rasterization rendering module, which is used to perform rasterization rendering according to the three-dimensional scene data for the parts with slow convergence speed and low-frequency rendering results;

a ray tracing rendering module, which is used to perform ray tracing rendering according to the texture for the parts with fast convergence speed and high-frequency rendering results;

a hybridizing module, which is used to mix the rendering results of the current frame and the historical frame according to the rasterized rendering result and/or the ray tracing rendering result.

A computer device comprising a memory and a processor, and the memory stores a computer program, wherein when the computer program is executed by the processor, the processor executes the web-side real-time hybrid rendering method combined with ray tracing.

Based on the solution in the above-mentioned embodiment, after the texture converted according to the three-dimensional scene data is obtained, for the part with slow convergence speed and low frequency of rendering result, employ rasterization rendering according to the texture; for the part with fast convergence speed and high-frequency rendering results, employ ray tracing rendering according to the texture; according to the rasterization rendering result and/or the ray tracing rendering result, the rendering results of the current frame and the historical frame are mixed. In this way, the problem of low rendering realism on the Web-side was solved, and high-quality global illumination effects can be achieved on the Web-side at a relatively low cost, which enhances the realism of rendering on the Web-side.

BRIEF DESCRIPTION OF THE DRAWINGS

In order to explain the embodiments of the present invention or the technical solutions in the existing techniques more clearly, the following drawings that need to be used in the embodiments or the existing techniques will be briefly introduced. Obviously, the drawings in the following description are only some embodiments of the present invention. For ordinary technical personnel in the field, other drawings can be obtained based on these drawings without creative work.

DETAILED DESCRIPTION OF THE EMBODIMENTS

In order to make the purposes, technical solutions, and advantages of the present invention clearer, the following further describes the present invention in detail with reference to the drawings and embodiments. It should be understood that the specific embodiments described herein are only used to explain the present invention, and do not limit the protection scope of the present invention.

Unless otherwise defined, all technical and scientific terms used herein have the same meaning as commonly understood by those skilled in the technical field of the present invention. The terminology used in the specification of the present invention herein are only for the purpose of describing specific embodiments, and are not intended to limit the present invention. The term "or/and" as used herein includes any and all combinations of one or more related listed items.

Figure 1:
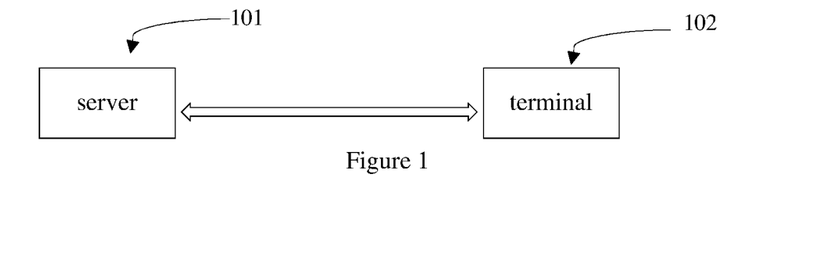
FIG. 1 is a schematic diagram of a working environment of an embodiment.

FIG. 1 is a schematic diagram of a working environment of an embodiment of the present invention. As shown in FIG. 1, the working environment of the Web-side real-time hybrid rendering method combined with ray tracing involves terminal 101 and server 102. The terminal 101 and the server 102 connect and transmit network data through a network. The terminal 101 may be a desktop terminal or a mobile terminal, and the mobile terminal may be a mobile phone, a tablet computer, a notebook computer, etc. The server 102 may be implemented by an independent server or a server cluster composed of multiple servers. The terminal 101 and the server 102 can communicate under any possible network, such as a local area network or the Internet.

Figure 2:
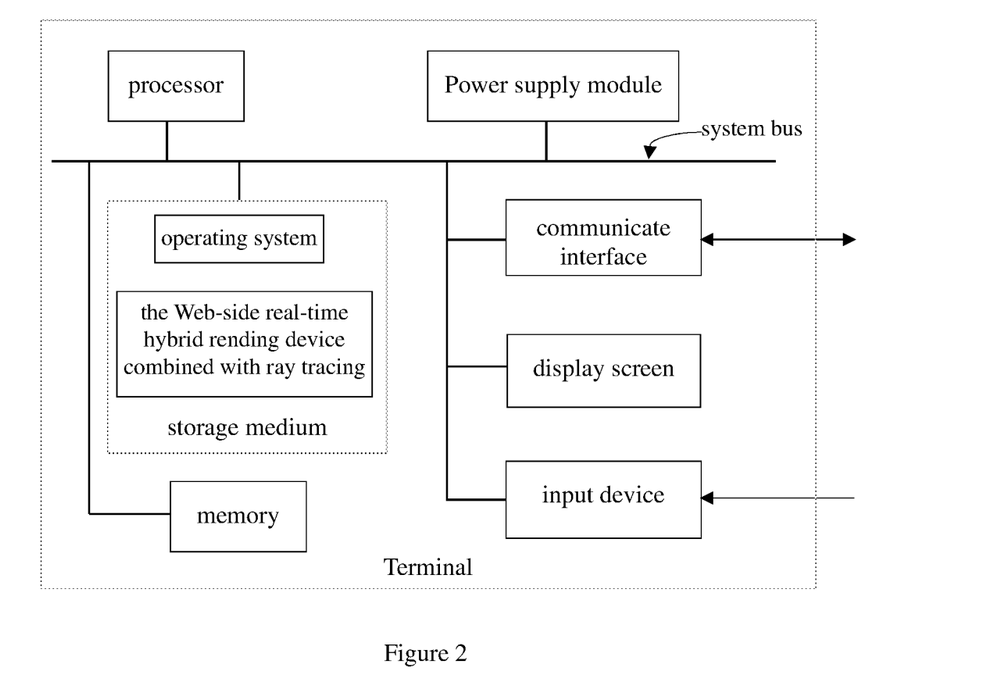
FIG. 2 is a schematic diagram of the composition structure of a terminal of an embodiment.

FIG. 2 is a schematic diagram of the composition structure of a terminal of an embodiment. As shown in FIG. 2, the terminal includes a processor, a non-volatile storage medium, a memory, a power supply module, a communication interface, a display screen, and an input device connected through a system bus. The non-volatile storage medium of the terminal stores an operating system and a computer application program corresponding to the Web-side real-time hybrid rendering method combined with ray tracing, that is, the Web-side real-time hybrid rendering device combined with ray tracing in FIG. 2. When the computer application program corresponding to this method is executed by the processor, the real-time hybrid rendering method on the Web-side combined with ray tracing is realized. The processor of the terminal is used to provide computing and control capabilities to support the operation of the entire terminal. The memory of the terminal provides an environment for the running of the program in the non-volatile storage medium. The memory can store computer-readable instructions. When the instructions are executed by the processor, the processor can execute a Web-side real-time hybrid rendering method combined with ray tracing. The network interface of the terminal is used for network connection and communication with external equipment, and the power interface of the terminal is used for connection with an external power source, and the external power source supplies power to the terminal through the power interface.

The technical personnel in the field can understand that the structure shown in FIG. 2 is only a block diagram of part of the structure related to the solution of the embodiment, and does not constitute a limitation on the terminal to which the solution of the embodiment is applied. Specifically, the terminal may include more or fewer parts than that shown in the figure, or combine some parts, or have a different arrangement of parts.

Figure 3:
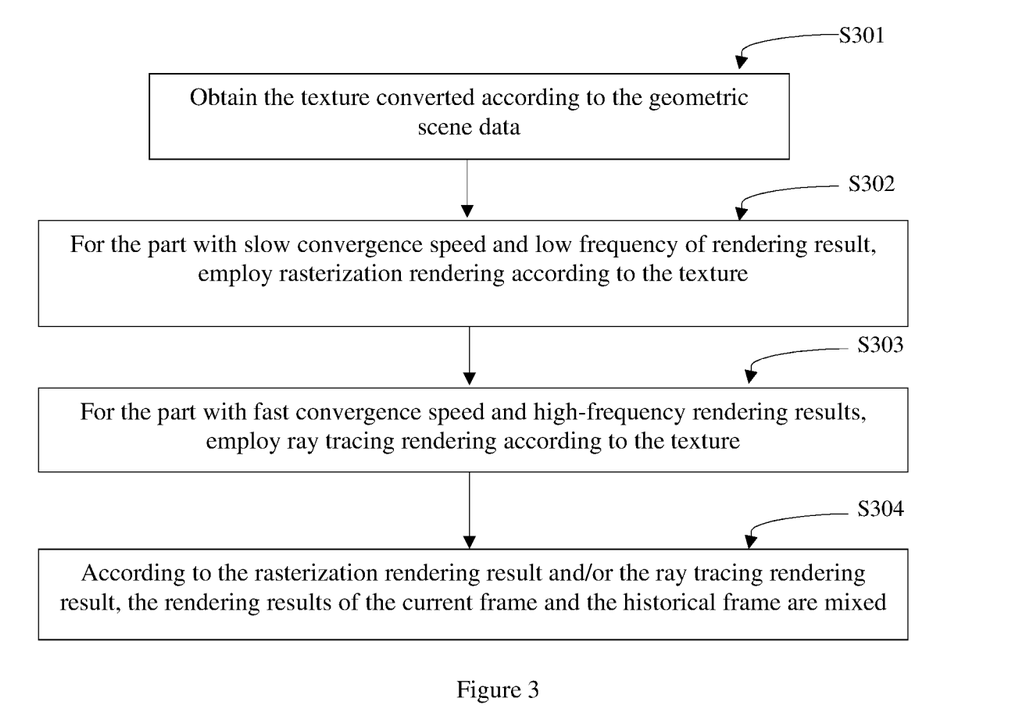
FIG. 3 is a flowchart of the real-time hybrid rendering method on the Web-side combined with ray tracing in an embodiment.

FIG. 3 is a flowchart of a Web-side real-time hybrid rendering method combined with ray tracing in an embodiment. In this embodiment, the processing procedure of the terminal 101 for rendering the three-dimensional model on the Web-side is taken as an example for description. As shown in FIG. 3, the Web-side real-time hybrid rendering method combined with ray tracing in this embodiment comprises steps S301 to S304.

Step S301: Acquire a texture converted according to the three-dimensional scene data.

The web (World Wide Web) is a network service built on the Internet, which can display graphics, audio, and video data at the same time to provide a graphical, easy-to-access intuitive interface for visitors. Rendering refers to the geometric description of a three-dimensional model and converting it into an image on a two-dimensional screen and displaying on the display screen. The three-dimensional model here refers to the three-dimensional structure of various objects generated by three-dimensional modeling software. In this embodiment, the three-dimensional scene data refers to the data related to the rendered three-dimensional model on the web-side, and is the data corresponding to the scene formed by splicing the three-dimensional models of the object. The three-dimensional scene data includes geometric structure data and texture data. The three-dimensional scene data can be directly rendered, or analyzed and processed before being rendered.

When rendering based on OpenGL and OpenGL ES API on the Web-side, OpenGL and OpenGL ES API can only transmit data through defined texture. Therefore, in this embodiment, it is necessary to convert the three-dimensional scene data into texture. Specifically, the three-dimensional scene data is transformed into a texture matrix through a certain transformation, so as to be obtained by OpenGL and OpenGL ES API for real-time rendering.

Figure 4:
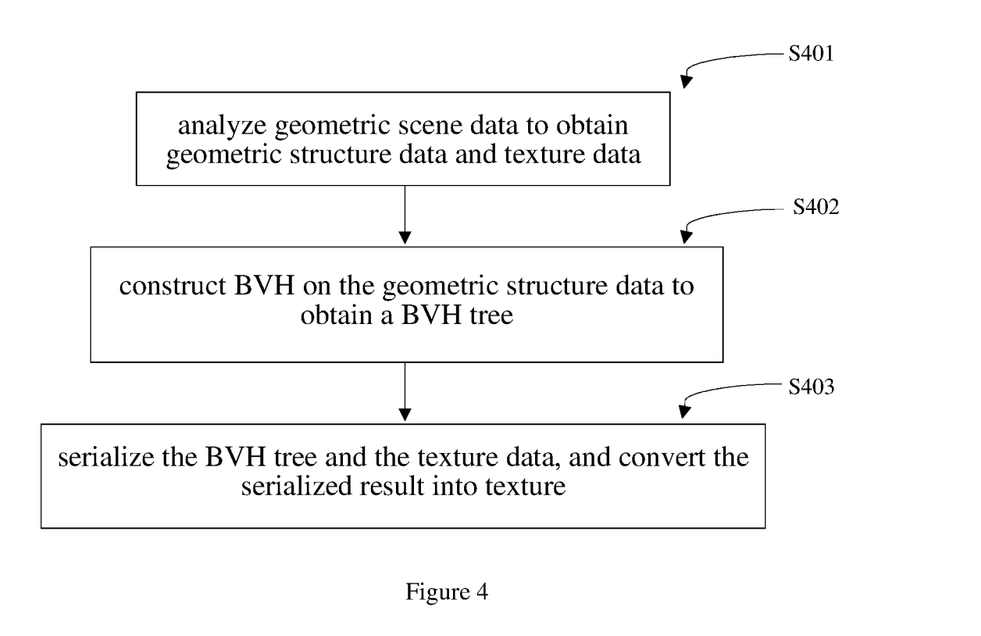
FIG. 4 is a schematic diagram of a process of converting textures according to three-dimensional scene data in an embodiment.

FIG. 4 is a schematic diagram of a process of converting textures according to three-dimensional scene data in an embodiment. As shown in FIG. 4, converting textures according to three-dimensional scene data comprises:

analyzing three-dimensional scene data to obtain geometric structure data and texture data;

constructing BVH on the geometric structure data to obtain a BVH tree;

serializing the BVH tree and the texture data, and converting the serialized result into texture.

In the embodiment, the specific process of converting three-dimensional scene data to texture may be performed in the CPU of the terminal, or may be performed in the CPU of the server to analyze the three-dimensional scene data to obtain geometric structure data and material data. The geometric structure data includes the three-dimensional vertex coordinates, direction data of Norma, and UV coordinates of the geometric surface, and the geometric surface includes triangular surface, quadrilateral surface, etc. According to the geometric structure data, the three-dimensional structure model of the object can be generated. The texture data is the data composed of the texture used in the geometric facets. Construct the three-dimensional model of the object from the three-dimensional structure model constructed from the geometric structure data and the texture used in the geometric facets. Render the three-dimensional model so as to display it on the screen.

BVH (Bounding box hierarchy) is a binary tree that can be used for the management of objects in a three-dimensional scene. By enclosing the objects through a simple bounding box and using the bounding box as a node to construct a binary tree, the management of geometric structure data and texture information in the three-dimensional scene data is achieved, i.e., the BVH tree can be used to manage the structure information, texture information of the objects in the three-dimensional scene, and the connection relationship with other objects.

In an embodiment, constructing BVH on the geometric structure data to obtain a BVH tree comprises:

dividing the space according to the bounding boxes of the geometric facets in the three-dimensional scene data, and set the nodes according to the relationship between the number of geometric facets in the divided space and the preset threshold to construct the BVH tree.

The BVH tree contains two types of nodes. One is a leaf node, which is at the top of the entire BVH tree and is used to store information about geometric facets. The other type is internal nodes. Internal nodes have left and right child nodes, which are used to store information about the bounding box corresponding to the left and right children. Internal nodes and leaf nodes are collectively referred to as nodes, and the nodes mentioned in the present invention are all leaf nodes and internal nodes.

In the embodiment, the three-dimensional scene is divided into space on different axes according to the size of the bounding box of the geometric facets. The setting of the axes is related to the coordinate system where the three-dimensional scene is located. When the three-dimensional scene is in the X, Y, Z three-dimensional coordinate system, the division axis needs to be parallel to any one of the X, Y, and Z axes. Each time a divided space is generated, a corresponding node is established for the newly generated divided space to record the information of the geometric facets in the divided space.

Set the preset threshold size according to the needs of the present invention. For example, set the threshold to 2. After the preset threshold is determined, the node can be generated and corresponding information can be saved according to the relationship between the number of geometric facets in the divided space and the preset threshold. When the number of geometric facets in the divided space is greater than the preset threshold, an internal node is generated, and the bounding box information surrounding all geometric facets in the divided space is stored in the internal node. When the number of geometric facets in the divided space is not greater than the preset threshold, a leaf node is generated, and the attribute information of the geometric facets in the divided space is stored in the leaf node.

Specifically, the process of constructing the BVH of the geometric structure data is: traverse the geometric facets in the geometric structure data, and divide the scene with different division axes according to the size of the bounding box of geometric facets. When the number of remaining patches in the divided space is greater than the preset threshold, an internal node is established, and the bounding box information surrounding all geometric facets in the divided space is stored in the internal node, and the divided space is recursively redivided and new nodes are generated. When the number of remaining patches in the divided space is not greater than the preset threshold, a leaf node is established, and the attribute information of the geometric facets in the divided space is stored in the leaf node.

The attribute information of the geometric facets includes the geometric structure information of the geometric facets and the texture information used, where the geometric structure information includes the three-dimensional vertex coordinates, direction data of normal line, and UV coordinates of the geometric facets. The texture information usually indexes the corresponding texture data in the form of subscripts to indicate which material data is used by the geometric facets.

In order to correctly access the geometric structure information and texture information of the entire scene in GLSL (OpenGL Shading Language), it is necessary to serialize the three-dimensional scene data.

In an embodiment, serializing the BVH tree and the texture data comprises:

calculating the number of bytes of each node of the BVH tree, and serialize the information of the node according to the number of bytes to obtain the node serialization result; wherein, for internal nodes, the node information includes node position information and the bounding box of the geometric facets information; for leaf nodes, node information includes node position information and geometric facets' attribute;

serializing the texture data to obtain a texture serialization result;

The node serialization result and the texture serialization result constitute the serialization result.

Wherein, the calculation of the number of bytes of each node of the BVH tree comprises:

For internal nodes, calculate the number of bytes of internal nodes based on the position information of the left and right child nodes of the internal node and the bounding box information stored by the left and right child nodes;

For the leaf node, the number of bytes of the leaf node is calculated according to the position information of the leaf node and the attribute information of the stored geometric facets.

When serializing the BVH tree, one calculates the number of bytes of each node, and then serializes the node information according to the number of bytes of each node. In the result of node serialization, the position offset of each node is recorded, that is, node position information. The offset is expressed in the form of subscripts in the serialization result. The position offset includes the total offset of each node with respect to the root node, and also includes the relative offset of each child node with respect to the parent node, that is, when serializing, it is necessary to serialize not only the position offset of each node relative to the root node, but also the relative offset of each child node relative to the parent node.

In addition, for internal nodes, it is also necessary to serialize the bounding box information of the geometric facets stored in the node. For leaf nodes, it is also necessary to serialize the attribute information of the geometric facets stored in the node.

Specifically, the serialization process of the BVH tree is: recursively traversing the nodes of the BVH tree, that is, calculating the subscript position of each node in the serialized result, that is, recording the total position offset of each node relative to the root node. Then, recursively re-traversing each node. For internal nodes, recording the left and right child nodes' subscripts of each internal node and its associated bounding box data, that is, recording the relative offset of left and right child nodes' relative to the parent node and its bounding box information. For the leaf node, serializing the attribute information of the geometric facets stored in the leaf node to obtain the node serialization result.

For texture data, serialization is also required, that is, all the texture data is traversed to obtain the texture serialization result. Exporting the texture serialization result to the node serialization result and together composing the serialization result, and storing in the buffer.

In one embodiment, converting the serialized result into a texture comprises:

Intercepting a segment of bytes in the serialized result as an element value to construct a texture matrix.

Using a graphics processing unit on the Web-side and renders the three-dimensional model according to OpenGL and OpenGL ES API. Therefore, using a graphics processing unit (GPU) on the Web-side may transmit data only through textures, that is, only receive textures. Hence, it is necessary to convert the serialized result in the buffer into a texture that can be received by the GPU. Specifically, intercepting a segment of byte stream in the buffer as an element value, and arranging in a matrix in order, that is, a texture matrix is constructed, and the conversion of the serialized result represented by the byte stream to the texture matrix is realized.

Of course, the conversion commands that come with OpenGL and OpenGL ES API can be called, such as the glTexImage2D command, to synchronize the serialization result of the buffer to the GPU, and access a byte stream in GLSL through texture2D as pixel information to generate texture matrix.

S302: For the part with slow convergence speed and low frequency of rendering result, employing rasterization rendering according to the texture.

Ray tracing based on physical reality can converge to obtain a very realistic rendering result. If fully adopting ray tracing rendering, it will cause huge computational overhead. Since different textures and lighting models have different convergence speeds, the effects of some materials and lighting models will also be rendered with a good sense of reality through rasterization rendering.

Therefore, a hybrid rendering method of ray tracing rendering and rasterization rendering that supports classifying according to the essential characteristics of textures and lighting models can not only obtain rendering results with high sense of reality, but also reduce computational overhead.

In the embodiment, texture models such as diffuse reflection and micro-surface, ambient light, and surface light source lighting models have slower convergence speed during the rendering process. Low frequency means that the function transformation is relatively slower, specifically, slow in converging into the noise-free rendered image. In the two-dimensional graphics space, they can be seen as a two-dimensional function, which changes slowly, so they are of slow convergence speed and low frequency of the rendering result. The slow convergence speed is manifested in slower to eliminate the noise points in the rendered image, which directly affects the rendering quality of the rendered image. For this part where the convergence speed is slow and the rendering result is of low-frequency, rasterization rendering can be applied to obtain a rendering result with high sense of reality on the premise of saving computation.

In an embodiment, the rasterization rendering according to the texture comprises:

Deserializing the texture into a BVH tree, obtain the three-dimensional scene data according to the BVH number, and perform rasterization rendering according to the three-dimensional scene data.

For rasterization rendering, as long as there is three-dimensional scene data, it can be directly rasterized rendering. Therefore, it is necessary to deserialize the texture into a BVH tree, and then obtain the original three-dimensional scene data according to the BVH tree mapping, and finally directly rasterize the three-dimensional scene data to render.

S303: For the part with fast convergence speed and high-frequency rendering results, employing ray tracing rendering according to the texture;

In the embodiment, texture models such as specular reflection and specular refraction have faster convergence speed during the rendering process. High frequency means that the function transformation is relatively faster, specifically, slow in converging into the noise-free rendered image. In the two-dimensional graphics space, they can be seen as a two-dimensional function, which changes fast, so they are of faster convergence speed and higher frequency of the rendering result. For this part where the convergence speed is fast and the rendering result is of high-frequency, ray tracing rendering can be applied to obtain a rendering result with high sense of reality.

The computational cost of ray tracing rendering is very large. In order to speed up ray tracing rendering, the constructed BVH tree is used to intersect the scene. In the BVH tree, the objects are surrounded by a simple bounding box. Before the ray intersects geometric facets in the scene, it will first intersect with the bounding box when intersecting the scene. If the ray does not touch the bounding box, it means that the ray must not intersect the geometric facets in the bounding box; if the ray touches the bounding box, then calculate whether the ray intersects the geometric facets within the bounding box.

In an embodiment, ray tracing rendering according to the texture comprises:

Deserializing the texture into a BVH tree, and intersect the scene of the BVH tree through stack-less intersection method to obtain the intersection result, and perform ray tracing rendering according to the intersection result.

With stack-less intersection method, a non-recursive BVH scene intersection process is realized in GLSL. Conventional recursive function calls the system stack, which may cause stack overflow. The stack-less method explicitly maintains a stack in the program to simulate recursion and thus avoid the overflow of system stack.

Specifically, a BVH node stack is explicitly maintained to record the information in the BVH intersection process, and simulate recursive intersection. Starting from subscript 0 (BVH root node), obtain the bounding box information of the node from the texture matrix, and perform the Ray-Box intersection. Record the corresponding distance and node subscript if there is an intersection point until all the nodes of the intersection are traversed, and calculates the minimum distance and node subscript. If the intersection is a leaf node of the BVH, that is, a single triangle, then calculate the distance from the ray to this triangle. The purpose of BVH intersection is to find the triangle closest to the ray.

Combining rasterization rendering and ray tracing rendering efficiently, and combining the respective rendering results to output, can greatly improve the convergence speed while ensuring high-quality rendering results.

S304: According to the rasterization rendering result and/or the ray tracing rendering result, the rendering results of the current frame and the historical frame are mixed.

On the basis of hybrid rendering, in order to improve rendering efficiency, it is necessary to converge in timing of rendering results. Exponential Moving Average method can be used to mix the rendering results of the current frame and the historical frame. Combining with the above hybrid rendering method, rapid convergence in timing can be achieved.

In this embodiment, the web-side real-time hybrid rendering method combined with ray tracing is based on the obtained texture converted according to the three-dimensional scene data. For the part with slow convergence speed and low frequency of rendering result, employ rasterization rendering according to the texture; for the part with fast convergence speed and high-frequency rendering results, employ ray tracing rendering according to the texture; according to the rasterization rendering result and/or the ray tracing rendering result, the rendering results of the current frame and the historical frame are mixed. In this way, the problem of low rendering realism on the Web-side was solved, and high-quality global illumination effects can be achieved on the Web-side at a relatively low cost, which enhances the realism of rendering on the Web-side.

Figure 5:
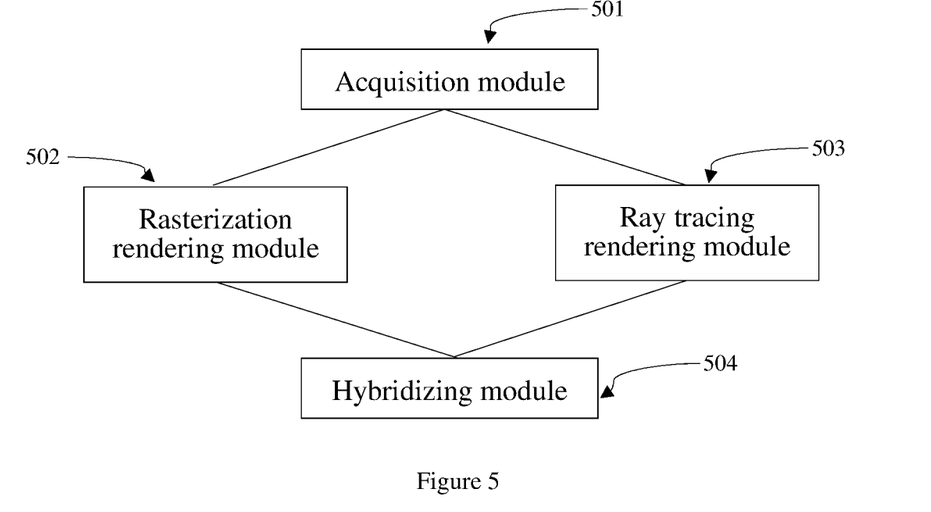
FIG. 5 is a schematic structural diagram of a Web-side real-time hybrid rendering device combined with ray tracing in an embodiment.

FIG. 5 is a schematic structural diagram of a Web-side real-time hybrid rendering device combined with ray tracing in an embodiment. As shown in FIG. 5, the Web-side real-time hybrid rendering device combined with ray tracing of the embodiment comprises:

The acquisition module 501, which is used to acquire the texture of the three-dimensional scene data conversion;

The rasterization rendering module 502, which is used to perform rasterization rendering according to the three-dimensional scene data for the parts with slow convergence speed and low-frequency rendering results;

The ray tracing rendering module 503, which is used to perform ray tracing rendering according to the texture for the parts with fast convergence speed and high-frequency rendering results;

The hybridizing module 504, which is used to mix the rendering results of the current frame and the historical frame according to the rasterized rendering result and/or the ray tracing rendering result.

In this embodiment, the web-side real-time hybrid rendering method combined with ray tracing is based on the obtained texture converted according to the three-dimensional scene data. For the part with slow convergence speed and low frequency of rendering result, employ rasterization rendering according to the texture; for the part with fast convergence speed and high-frequency rendering results, employ ray tracing rendering according to the texture; according to the rasterization rendering result and/or the ray tracing rendering result, the rendering results of the current frame and the historical frame are mixed. In this way, the problem of low rendering realism on the Web-side was solved, and high-quality global illumination effects can be achieved on the Web-side at a relatively low cost, which enhances the realism of rendering on the Web-side.

Based on the above-mentioned embodiments, in an embodiment, a computer device is further provided, including an memory and a processor. The memory stores a computer program, wherein when the computer program is executed by the processor, the processor executes the any of the Web-side real-time hybrid rendering methods combined with ray tracing as described in above embodiments.

A person of ordinary skill in the art can understand that all or part of the processes in the above-mentioned embodiments can be implemented by instructing relevant hardware through a computer program. The program can be stored in a non-volatile computer readable storage medium. When the program is executed, it may include the processes of the above-mentioned embodiments.

Wherein, any reference to memory, storage, database or other media used in the embodiments provided in the present invention may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration instead of a limitation, RAM is available in many forms, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SL-DRAM), Ranbus Direct RAM (RDRAM), Direct Rambus Dynamic RAM (DRDRAM), and Rambus Dynamic RAM (RDRAM), etc.

The specific implementations described above describe the technical solutions and beneficial effects of the present invention in detail. It should be understood that the above descriptions are only the most preferred embodiments of the present invention and are not intended to limit the present invention. Any modifications, complements and equivalent replacements made within the scope shall be included in the protection scope of the present invention.

The invention is claimed is:

1. A Web-side real-time hybrid rendering method combined with ray tracing, comprising the following steps:
   obtaining a texture converted according to three-dimensional scene data;
   employing rasterization rendering according to the texture for a part with slow convergence speed and low frequency of rendering result;
   employing ray tracing rendering according to the texture for a part with fast convergence speed and high-frequency rendering results; and
   mixing the rendering results of a current frame and a historical frame according to the rasterization rendering result and/or the ray tracing rendering result, wherein the conversion of textures according to three-dimensional scene data comprises:
   analyzing three-dimensional scene data to obtain geometric structure data and texture data;
   constructing a bounding box hierarchy (BVH) on the geometric structure data to obtain a BVH tree; and
   serializing the BVH tree and the texture data, and convert the serialized result into texture.

2. The Web-side real-time hybrid rendering method combined with ray tracing according to claim 1, wherein said constructing BVH on the geometric structure data to obtain a BVH tree comprises:

dividing the space according to the bounding boxes of the geometric facets in the three-dimensional scene data, and setting the nodes according to the relationship between the number of geometric facets in the divided space and the preset threshold to construct the BVH tree.

3. The Web-side real-time hybrid rendering method combined with ray tracing according to claim 1, wherein said serializing the BVH tree and the texture data comprises:
calculating the number of bytes of each node of the BVH tree, and serialize the information of the node according to the number of bytes to obtain the node serialization result; wherein, for internal nodes, the node information includes node position information and the bounding box of the geometric facets information; for leaf nodes, node information includes node position information and geometric facets' attribute;
serializing the texture data to obtain a texture serialization result;
constituting the serialized result from the node serialization result and the texture serialization result.

4. The Web-side real-time hybrid rendering method combined with ray tracing according to claim 3, wherein calculating the number of bytes of each node of the BVH tree comprises:
for internal nodes, calculating the number of bytes of internal nodes based on the position information of the left and right child nodes of the internal node and the bounding box information stored by the left and right child nodes;
for the leaf node, calculating the number of bytes of the leaf node according to the position information of the leaf node and the attribute information of the stored geometric facets.

5. The Web-side real-time hybrid rendering method combined with ray tracing according to claim 1, wherein converting the serialized result into texture comprises:
intercepting a segment of bytes in the serialized result as an element value to construct a texture matrix.

6. The Web-side real-time hybrid rendering method combined with ray tracing according to claim 1, wherein performing ray tracing rendering according to the texture comprises:
deserializing the texture into a BVH tree, and intersecting the scene of the BVH tree through stack-less intersection method to obtain the intersection result, and performing ray tracing rendering according to the intersection result.

7. The Web-side real-time hybrid rendering method combined with ray tracing according to claim 1, wherein employing rasterization rendering according to the texture comprises:
deserializing the texture into a BVH tree, obtaining the three-dimensional scene data according to the BVH tree, and performing rasterization rendering according to the three-dimensional scene data.

8. A Web-side real-time hybrid rendering device combined with ray tracing, characterized in that the device comprises:
an acquisition module, which is used to acquire the texture of the three-dimensional scene data conversion;
a rasterization rendering module, which is used to perform rasterization rendering according to the three-dimensional scene data for the parts with slow convergence speed and low-frequency rendering results;
a ray tracing rendering module, which is used to perform ray tracing rendering according to the texture for the parts with fast convergence speed and high-frequency rendering results; and
a hybridizing module, which is used to mix the rendering results of the current frame and the historical frame according to the rasterized rendering result and/or the ray tracing rendering result;
wherein the acquisition module is adapted to acquire the texture of the three-dimensional scene data conversion by:
analyzing three-dimensional scene data to obtain geometric structure data and texture data;
constructing a bounding box hierarchy (BVH) on the geometric structure data to obtain a BVH tree; and
serializing the BVH tree and the texture data, and convert the serialized result into texture.

9. A computer device comprising a memory and a processor, and the memory stores a computer program, wherein when the computer program is executed by the processor, the processor executes the web-side real-time hybrid rendering method combined with ray tracing as described in claim 1.

* * * * *